United States Patent [19]

Luciano et al.

[11] Patent Number: 4,625,933

[45] Date of Patent: Dec. 2, 1986

[54] PROCESS AND DEVICE FOR REGULATING THE MOVEMENT OF A MEMBER BY EMPLOYING A FLUID FLOW

[75] Inventors: Gérard Luciano, St. Laurent-du-Var; Pierre Poveda, Le Cannet-Rocheville; Pierre Croiset, Mandelieu, all of France

[73] Assignee: Societe Nationale Industrielle Aerospatiale, Paris, France

[21] Appl. No.: 651,089

[22] Filed: Sep. 17, 1984

[30] Foreign Application Priority Data

Oct. 13, 1983 [FR] France .................................. 83 16292

[51] Int. Cl.⁴ ........................ B65H 77/00; B66D 5/28
[52] U.S. Cl. ..................................... 242/99; 188/298; 242/156; 254/377; 267/122
[58] Field of Search ........................ 242/99, 156, 75.4; 188/298; 267/122, 123; 182/233, 238; 254/377

[56] References Cited

U.S. PATENT DOCUMENTS

| | | | |
|---|---|---|---|
| 1,761,311 | 6/1930 | Redmond | 182/233 |
| 1,888,912 | 11/1932 | Doose | 254/377 X |
| 2,919,883 | 1/1960 | Murphy | 267/122 X |
| 3,101,937 | 8/1963 | Stearns | 267/122 |
| 3,563,307 | 2/1971 | Paine et al. | 188/298 |
| 3,595,528 | 7/1971 | Virkki | 242/99 |
| 3,834,671 | 9/1974 | du Buisson | 242/99 |
| 4,032,126 | 6/1977 | Laughlin et al. | 188/298 X |
| 4,452,430 | 6/1984 | Kankkunen | 242/99 X |

FOREIGN PATENT DOCUMENTS 1154547  9/1963  Fed. Rep. of Germany .
0205207 12/1983  Fed. Rep. of Germany ...... 182/238

Primary Examiner—John M. Jillions
Attorney, Agent, or Firm—Fisher, Christen & Sabol

[57] ABSTRACT

The invention relates to a process and device for regulating at any instant the speed of a mobile member, such as a pulley, moving in a stroke of determined uniform direction, by employing a fluid passing under pressure through an orifice of restricted section. According to the invention, said pressurized fluid is made to pass several times alternately in one direction and in the other through said orifice, during said stroke of determined uniform direction. The invention is more particularly applicable to the deployment of appendices mounted on board space vessels.

6 Claims, 8 Drawing Figures

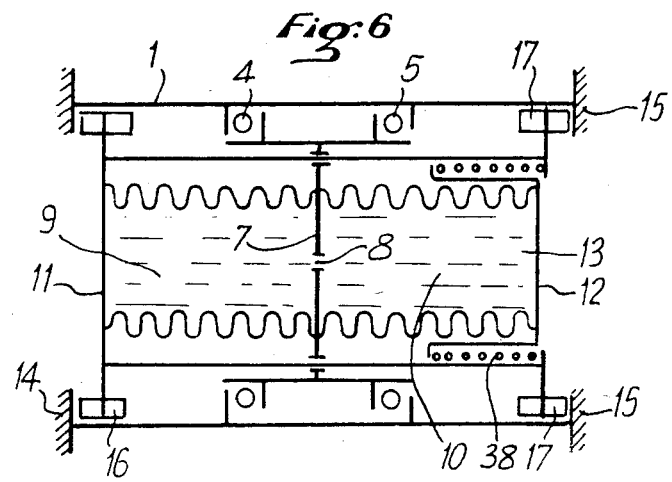
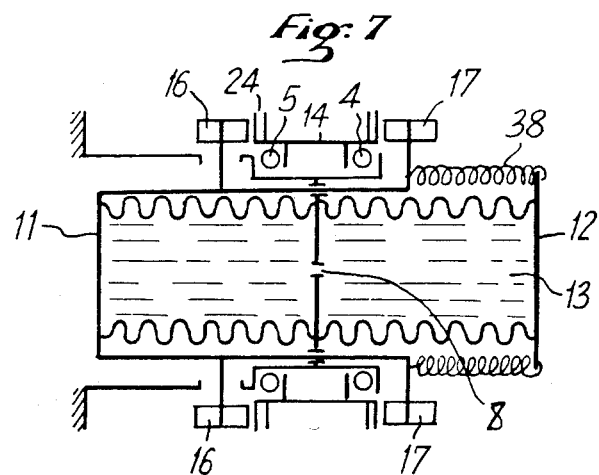
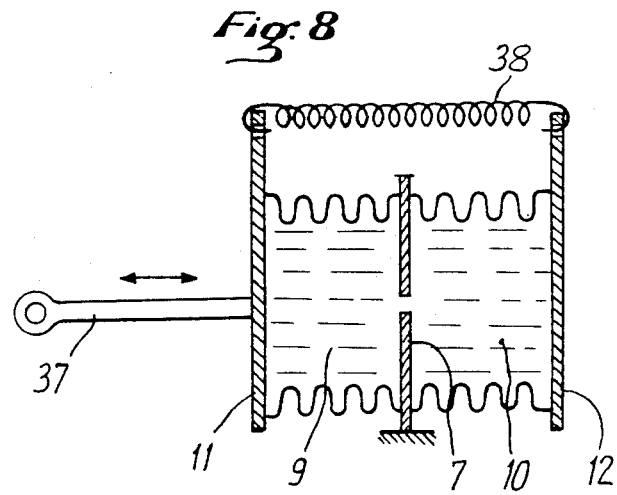

PROCESS AND DEVICE FOR REGULATING THE MOVEMENT OF A MEMBER BY EMPLOYING A FLUID FLOW

The present invention relates to a process and to a device for regulating at any instant the speed of a mobile member moving in a stroke of determined uniform direction, by employing a fluid passing under pressure through an orifice of restricted section. This invention, although not exclusively, is applied more particularly to the control of the deployment of appendices mounted on space vehicles (solar panels, antennas, etc...) and it will be described hereinafter more particularly in connection with this application.

It is known that, particularly for reasons of structural dimensioning, the speed of deployment of the appendices mounted on space vehicles must be limited at least at the end of stroke, so that the energy to be absorbed at the moment of the end of stroke shock is as low as possible. It is preferably attempted to regulate the speed of said appendices continuously for the whole duration of deployment thereof, in order precisely to avoid the end of stroke shock.

Patents DE-C-No. 1 154 547 and U.S. Pat. No. 3,563,307 for example disclose a regulating device comprising two bellows in communication via an orifice of restricted section, so that a fluid contained in the first passes into the second when a mobile member rigidly connected to the first bellows compresses the latter. In this way, the resistance opposed by said orifice against the passage of the fluid makes it possible to regulate the speed of displacement of said mobile member. At the end of its deployment stroke, said mobile member of U.S. Pat. No. 3,563,307 may possibly be returned into initial position by the action of outside means and a valve, mounted in parallel on said orifice, is provided to rapidly return the fluid (oil) from the second bellows into the first by shortcircuiting said orifice.

Such a known device is efficient, but it presents the drawback of being of restricted use and of being able to absorb only a limited amount of energy. In fact, since the mobile member is rigidly connected to said first bellows, the compression stroke of the latter is equal to the stroke of said mobile member. The result of this is that, unless bellows of considerable length are provided, which would involve technical production difficulties and the drawbacks of large dimensions, the use of this known device must be limited to mobile members whose stroke is small. Furthermore, the energy absorbed by the first bellows is a function of the compression stroke thereof and of the stiffness of the liquid-orifice system. In order to be able to increase this absorbed energy, it is therefore necessary to increase said stroke and/or said stiffness. As mentioned above, the possibilities of increasing the compression stroke of the first bellows are restricted, with the result that the stiffness of the liquid-orifice system might be increased, for example by increasing the viscosity of the liquid or by reducing the section of passage of said orifice. This would then result in an increase in pressure of the liquid inside the first bellows, so that the latter would have to be thick and resistant. Its own stiffness would then be increased and it would intervene in the law of damping of the movement of the mobile member by largely complicating the adaptation of impedance between the regulating device and the mobile member.

It is an object of the present invention to remedy these drawbacks backs and, by employing the passage of a fluid through an orifice, to enable the speed of a mobile member to be regulated, even in the event of the stroke and/or the energy of said mobile member being high.

To this end, according to the invention, the process for regulating at any instant the speed of a mobile member moving in a stroke of determined uniform direction, by employing a fluid passing under pressure through an orifice of restricted section, is noteworthy in that, during said stroke of uniform direction, said pressurzied fluid is made to pass several times alternately in one direction and in the other through said orifice.

Thanks to the invention, it is as though the stroke of the first bellows of the prior known device were multiplied so that the movement of a mobile member may be regulated whatever its stroke and the energy to be dissipated.

To carry out the process, a device for regulating at any instant the speed of a mobile member moving in a stroke of determined uniform direction, by employing a fluid passing under pressure through an orifice of restricted section, is provided, which is noteworthy in that it comprises means for causing said fluid to be passed under pressure alternately several times in one direction and in the other through said orifice, during said stroke of determined uniform direction of said mobile member.

Said means are preferably controlled by said mobile member.

In a first embodiment employing a known assembly of two aligned bellows, filled with an incompressible fluid, coaxial and joined by a common partition in which said orifice of restricted section is made, said bellows being adapted to be compressed parallel to their common axis, said mobile member comprises a pulley which is coaxial to said bellows and on which is wound a cable and the ends of the bellows opposite said common partition are alternately compressed by cams in the course of rotation of the pulley.

The common partition and the bellows may rotate with said pulley, whilst said cams are fixed. As a variant, the common partition and the bellows are fixed, whilst said cams rotate with said pulley.

According to a second embodiment, a plurality of assemblies are provided, each comprising two aligned bellows, filled with an incompressible fluid, coaxial and joined by a common partition in which an orifice of restricted section is made, said bellows of an assembly being adapted to be compressed parallel to their common axis, and the device is noteworthy in that said mobile member comprises a pulley rotating with a shaft provided with a crank, a plurality of bellows assemblies are distributed about the axis common to said pulley and to said shaft, the common partition of each assembly is journalled on a fixed frame parallel to said common axis and in that one end of one of the bellows of each assembly is connected to said crank by a connecting rod.

In the different embodiments above, the two bellows of an assembly are advantageously identical and the alternative movements of compression of the two bellows are of equal amplitudes, although of opposite directions.

A connection is advantageously provided between said ends of the bellows opposite the common wall in order to maintain the overall volume of the two bellows constant. This measure avoids the pressure inside a bellows possible becoming close to a vacuum.

As is known, the fluid contained in the bellows is incompressible and may be constituted by an oil or the like. In the event of the device operating in an atmosphere where temperature variations are considerable, as is the case, for example, in space depending on whether the device is directed towards the sun or, on the contrary, hidden from the sun, insulation screens and reheating devices may be provided, and/or fluids such as mercury whose viscosity varies little with the temperature may be used, so that the operating conditions of the device are maintained as constant as possible.

If the variations in temperature applied to the device were sufficiently great to bring about a considerble expansion of the fluid in the bellows and if a connection were provided between the ends of said bellows, in the manner indicated hereinabove, it would be indispensable to render this connection elastic so that it presents an elastic force at least slightly greater than the force of actuation of the bellows, so that the pressure of the drawn bellows is not zero.

The invention will be more readily understood on reading the following description with reference to the accompanying drawings, in which.

FIGS. 6, 7 and 8 schematically illustrate elastic connections provided between the ends of the bellows and capable of absorbing possible expansions.

In these Figures, like references designate like elements.

Figure 1:
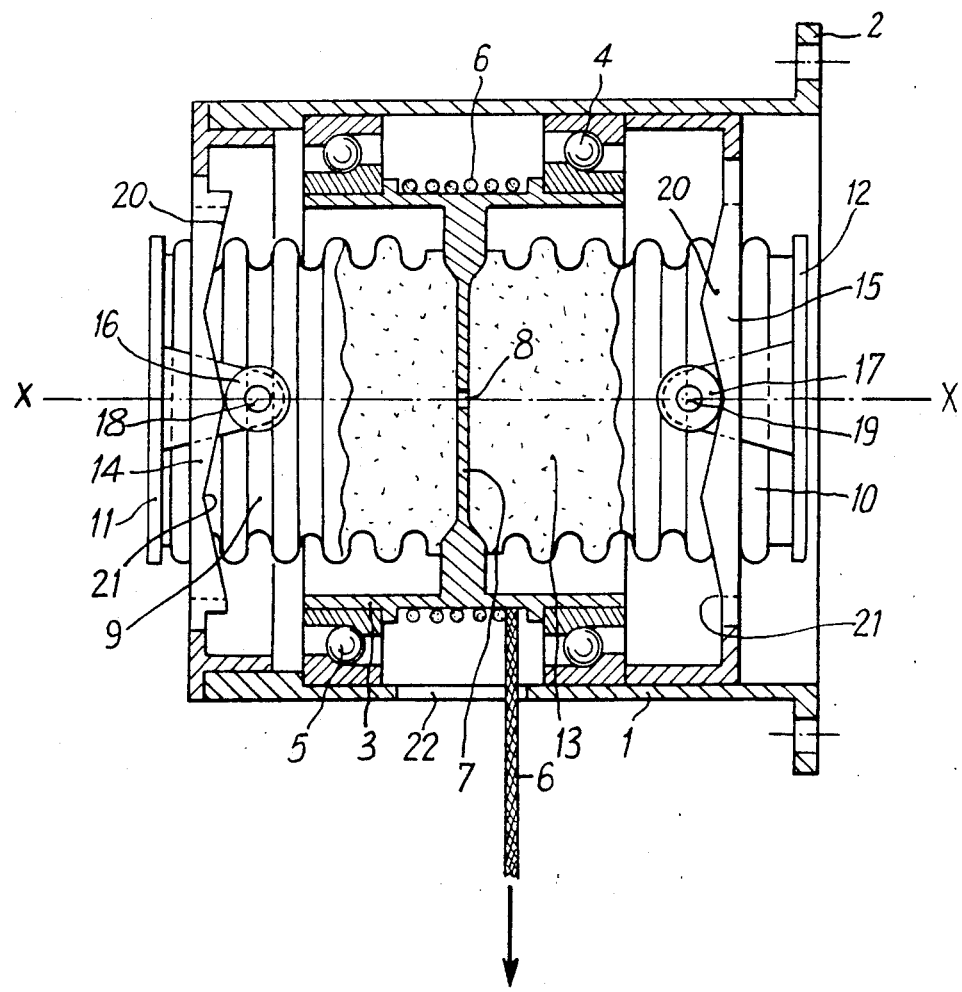
FIG. 1 is a schematic view in longitudinal section of a first embodiment of the device according to the invention.

Referring now to the drawings, the device according to the invention, shown in FIG. 1, comprises a tubular support or casing 1 provided with a fixing flange 2.

Inside the casing 1 is disposed a sleeve 3 acting as a pulley and mounted to rotate, about an axis X—X, with respect to the inner wall of said casing, thanks to bearings 4 and 5 with oblique contact. On the pulley 3 is wound a cable 6 adapted to control the movement of an appendix mounted on a space craft (not shown). The pulley 3 is hollow and it comprises an inner partition or wall 7 which is fast therewith and which is orthogonal to the axis of rotation X—X. The wall 7 is pierced with a through hole 8, of restricted section.

Identical bellows 9 and 10, for example made of metal, are housed inside the pulley 3 and the casing 1 and comprise an open end of which the edge is connected to the wall 7 whilst surrounding the hole 8, the bellows 9 and 10 being disposed on either side of said wall 7. The bellows 9 and 10 present an at least approximate form of revolution and their axes merge with axis X—X. The pulley 3, the wall 7 and the bellows 9 and 10 form an integral assembly and this assembly is rigid in rotation about said axis X—X.

Bellows 9 and 10 are obturated, at their ends opposite wall 7, by bottom ends 11 and 12 respectively and are filled with a liquid 13. They are compressible and expansible in the direction of axis X—X. It will be appreciated that the liquid 13 passes from one bellows to the other, through the hole 8 in the wall 7, as a function of the relative state of compression of the bellows 9 and 10 with respect to each other.

Annular cams, reference 14 and 15 respectively, are disposed towards the bottom ends 11 and 12 of bellows 9 and 10. Cams 14 and 15 are coaxial to axis X—X and fast with the casing 1. An assembly of rollers 16 and an assembly of rollers 17, regularly distributed about axis X—X and mounted to rotate respectively about pins 18 or 19 fast with said bottom ends 11 and 12, are adapted to roll on cams 14 and 15. Rollers 16 and rollers 17 are pressed elastically against the respective cams 14 and 15 by the bellows 9 and 10 and the profile of said cams shows alternating projections 20 and depressions 21.

The assembly formed by elements 9, 10, 11, 12 is perfectly symmetrical with respect to wall 7. However, the arrangement of rollers 16 and of cam 14, on the one hand, and the arrangement of rollers 17 and of cam 15, on the other hand, are disposed so that, when rollers 16 are in abutment on a projection 20 of cam 14, rollers 17 abut in a depression 21 of cam 15, and vice versa.

In this way, when cable 6, which passes through the casing 1 through an opening 22, unwinds under the action of outside means (not shown), it rotates pulley 3, wall 7, bellows 9 and 10 and rollers 16 and 17 about axis X—X, so that, due to the cooperation of said rollers with their respective cam 14 or 15, said bellows 9 and 10 are alternately compressed several times per revolution, i.e. the direction of passage of the fluid 13 through the hole 8 is changed several times per revolution of the rotating system 3, 7, 9, 10, 16 and 17.

Cams 14 and 15 and rollers 16 and 17 form, in cooperation with casing 1, a rigid connection imposing on the bellows assembly 9-10 an invariable total length. Therefore the overall volume of the two bellows 9 and 10 does not vary, only the volumes of fluid 13 on either side of the wall 7 varying cyclically and alternately during rotation of the system 3, 7, 9, 10, 16 and 17 about axis X—X. The alternating movement of liquid 13 through hole 8 allows regulation of the movement of translation of the bellows 9 and 10 parallel to axis X—X, therefore control of the rotation of said bellows about axis X—X and, consequently, the unwinding of cable 6.

Figure 2:
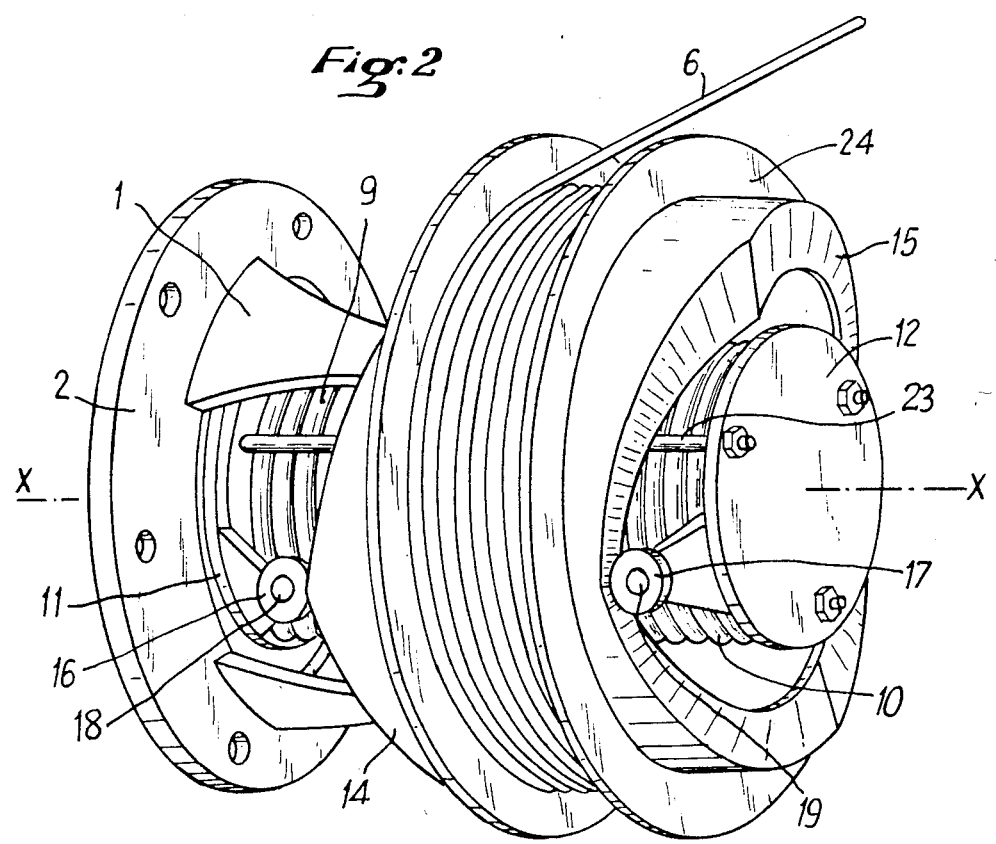
FIG. 2 shows in perspective a variant embodiment of the device according to the invention.
Figure 3:
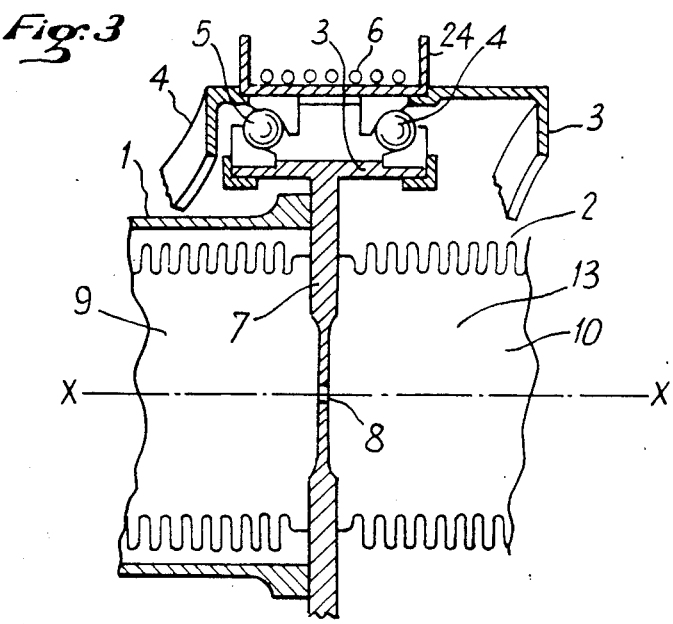
FIG. 3 is a partial longitudinal section through the device of FIG. 2.

The device according to the invention, illustrated in FIGS. 2 and 3, is similar to that of FIG. 1. However, instead of comprising, like the device of FIG. 1, a rotating bellows assembly on the one hand, and, on the other hand, fixed cams, it comprises rotation cams and a fixed bellows assembly.

This device of FIGS. 2 and 3 still comprises the tubular support 1 provided with its fixing flange 2. The sleeve 3 and the wall 7 are rendered fast with the support 1. Bellows 9 and 10 equipped with their bottom ends 11 and 12 and with their rollers 16 and 17, are rendered fast with wall 7, pierced with the hole 8. Spacer rods 23, disposed between bottom ends 11 and 12, ensure that the assembly of the two bellows 9 and 10 is of contant length. Assembly 3, 7, 9, 10, 16, 17 and 23 is thus fixed.

Furthermore, on the sleeve 3 are mounted bearings 4 and 5 with oblique contact, which allow rotation of a pulley 24 about axis X—X and with respect to said assembly. The cable 6 is wound on said pulley 24. Cams 14 and 15 are fast with the sides of the pulley 24 and cooperate with rollers 16 and 17 respectively.

It is easily seen that, when the pulley 24 and cams 14 and 15 rotate about axis X—X, a cyclic and alternate compression of bellows 9 and 10 is obtained in the manner indicated hereinabove, this resulting in variations in the direction of passage of the fluid 13 through the hole 8 and the consequent effect of regulation.

Figure 5:
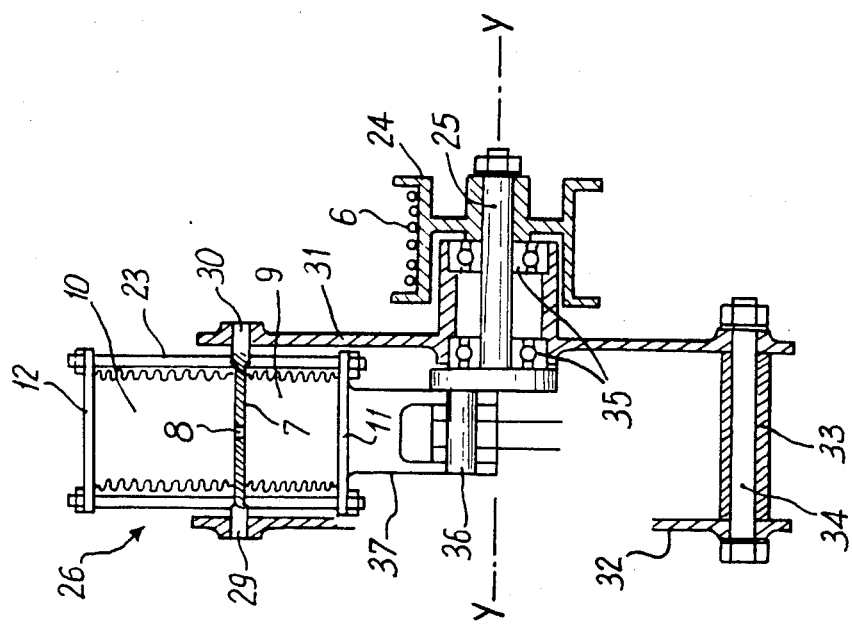
FIGS. 4 and 5 illustrate, in schematic partial views in elevation and in section respectively, another variant embodiment of the device according to the invention.
Figure 4:
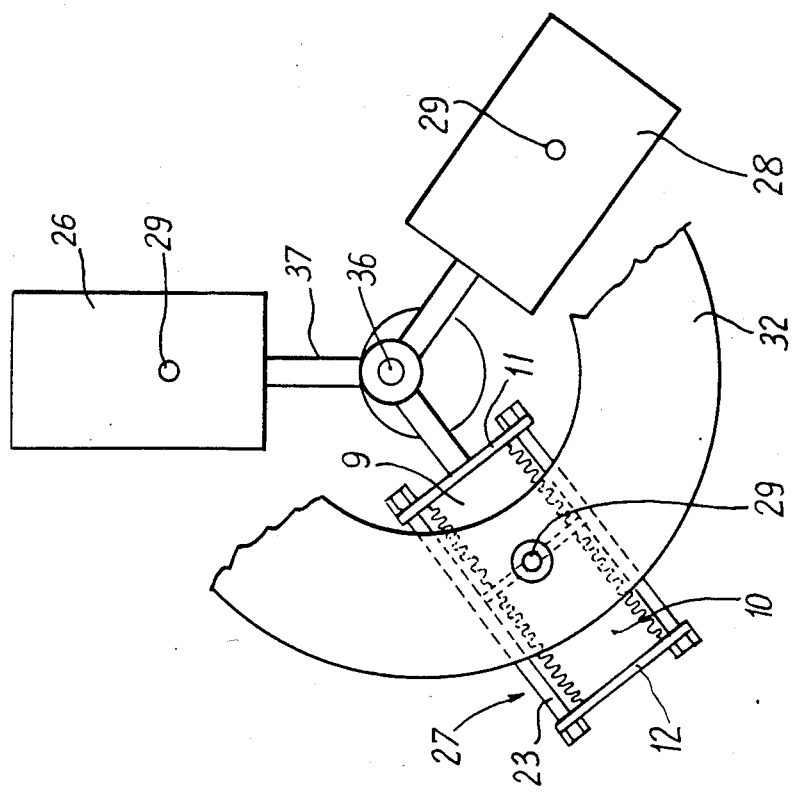

In the embodiment shown in FIGS. 4 and 5, a plurality of bellows assemblies are provided, regularly distributed about axis Y—Y of a shaft 25. For example, three assemblies 26, 27 and 28 are provided, distributed at 120° about said axis Y—Y. Each of these assemblies 26, 27 or 28 comprises a partition wall 7 pierced with a hole 8, bellows 9 and 10, bottom ends 11 and 12 and spacer rods 23 for connection ends 11 and 12, as shown in FIG. 2.

The partition wall 7 of each assembly 26, 27 and 28 is provided with opposite journals 29 and 30, one rotating in a frame 31, the other in a ring 32 which is rendered fast therewith via small columns 33 and tie-rods 34.

The shaft 25 is mounted in frame 31 via roller bearings 35. It bears a crank 36 at one of its ends and rotates with the pulley 24 on which the cable 6 is wound.

The line of the journals 29, 30 of each assembly 26, 27, 28 is parallel to axis Y—Y of shaft 25 of pulley 24 and the crank 36 bears connecting rods 37, each fast with the end 11 of one of said assemblies 26 to 28.

In this way, when cable 6 unwinds, driving pulley 24, shaft 25 and crank 36 in rotation about axis Y—Y, the connecting rods 37 alternately provoke compression of bellows 9 and 10 of each assembly 26, 27 and 28. The alternate passage of fluid 13 through the hole 8 in the respective walls 7 and the desired effect of regulation are therefore obtained. This effect of regulation is very regular, due to the plurality of assemblies 26 to 28, regularly distributed about axis Y—Y, each furnishing offset, but overlapping dampings.

As mentioned above, in the event of the device according to the invention having to operate in an environment where there are considerable variations in temperature, it may be necessary to provide an elastic element in the mechanical connection provided between the ends 11 and 12 of the bellows 9 and 10 of an assembly.

FIG. 6 schematically shows an example of such an elastic connection, for example appropriate for the device of FIG. 1. A compression spring 38 is interposed between the end 12 and the rollers 17. In the embodiment shown schematically in FIG. 7, more particularly intended for the device of FIGS. 2 and 3, a draw spring 38 is interposed between end 12 and rollers 17. Finally, in the embodiment shown schematically in FIG. 8, more particularly intended for the device of FIGS. 4 and 5, one or more draw springs 38 are provided between ends 11 and 12. In the examples of FIGS. 7 and 8, springs 38 replace rods 23.

Of course, the elastic force exerted by springs 38 must be greater than the force of actuation of the bellows, for operation of the device to be correct.

What is claimed is:

1. A device for regulating at any instant the speed of a mobile member moving in a stroke of determined uniform direction by employing a fluid passing under pressure through an orifice of restricted section, comprising:
   (A) an aligned assembly of two bellows filled with an incompressible fluid, sadi bellows being coaxial and joined by a common partition having located thereon said orifice of restricted section, and said bellows being compressible parallel to their common axis;
   (B) said mobile member comprising a pulley coaxial to said bellows having wound thereon a cable, whereby movement of said cable rotates said pulley;
   (c) cams for alternately compressing ends of said bellows opposite said partition as said pulley rotates for causing said fluid to be passed through said orifice several times in alternate directions during rotation of said pulley.

2. The device of claim 1, wherein the common partition and the bellows are rotatable with said pulley, and wherein said cams are in fixed relationship to said rotatable pulley, common partition and bellows.

3. The device of claim 1, wherein said cams are rotatable with said pulley, and wherein both the common partition and the bellows are in fixed relationship to said rotatable cams and pulley.

4. The device of claim 1, wherein the two bellows of an assembly are identical and the alternative movements of compression of the two bellows are of equal amplitudes, although of opposite directions.

5. The device of claim 1, further comprising at least one spacer means connecting said ends to maintain an overall volume of said bellows constant.

6. The device of claim 5, wherein said spacer means is elastic to allow expansion of the fluid contained in the bellows and to exert an elastic force at least slightly greater than a force of actuation of the bellows, whereby pressure of the bellows when they are drawn is not zero.

* * * * *